(12) United States Patent
El Bounia et al.

(10) Patent No.: US 7,838,587 B2
(45) Date of Patent: Nov. 23, 2010

(54) POLYMER MATERIALS CONTAINING DISPERSED CARBON NANOTUBES

(75) Inventors: Nour Eddine El Bounia, Orthez (FR); Ludwik Leibler, Paris (FR); Sylvie Tence-Girault, Issy-les-Moulineaux (FR); Corinne Soulie-Ziakovic, Paris (FR)

(73) Assignees: Arkema France, Colombes (FR); C.N.R.S., Paris (FR)

( * ) Notice: Subject to any disclaimer, the term of this patent is extended or adjusted under 35 U.S.C. 154(b) by 618 days.

(21) Appl. No.: 11/910,565

(22) PCT Filed: Mar. 31, 2006

(86) PCT No.: PCT/FR2006/000708

§ 371 (c)(1),
(2), (4) Date: Oct. 3, 2007

(87) PCT Pub. No.: WO2006/106214

PCT Pub. Date: Oct. 12, 2006

(65) Prior Publication Data

US 2008/0207817 A1 Aug. 28, 2008

(30) Foreign Application Priority Data

Apr. 4, 2005 (FR) .................. 05 03332

(51) Int. Cl.
| | | |
|---|---|---|
| *B60C 1/00* | (2006.01) | |
| *B29C 47/00* | (2006.01) | |
| *B32B 3/10* | (2006.01) | |
| *G11B 5/64* | (2006.01) | |
| *H01B 1/00* | (2006.01) | |
| *H01B 1/06* | (2006.01) | |
| *B32B 27/00* | (2006.01) | |
| *B29D 22/00* | (2006.01) | |

(52) U.S. Cl. .................. 524/495; 428/36.9; 428/137; 428/141; 428/421; 428/35.7; 252/500; 252/511

(58) Field of Classification Search .................. 524/495; 428/36.9, 137, 141, 421, 35.7; 252/500, 252/511

See application file for complete search history.

(56) References Cited

U.S. PATENT DOCUMENTS

| | | | |
|---|---|---|---|
| 3,287,443 A | 11/1966 | Saito et al. | |
| 3,657,391 A | 4/1972 | Curtman | |
| 3,808,180 A | 4/1974 | Owens | |
| 3,985,704 A | 10/1976 | Jones | |
| 4,096,202 A | 6/1978 | Farnham et al. | |
| 4,180,494 A | 12/1979 | Fromuth et al. | |
| 4,260,693 A | 4/1981 | Liu | |
| 4,299,928 A | 11/1981 | Witmann | |
| 5,591,382 A | 1/1997 | Nahass et al. | |
| 5,643,502 A | 7/1997 | Nahass | |
| 5,643,990 A | 7/1997 | Uehara | |
| 5,651,922 A | 7/1997 | Nahass | |
| 5,677,387 A | 10/1997 | Bayard et al. | |
| 5,686,534 A | 11/1997 | Bayard et al. | |
| 5,886,112 A | 3/1999 | Vuillemin et al. | |
| 6,221,283 B1 | 4/2001 | Dharmarajan et al. | |
| 6,905,667 B1 | 6/2005 | Chen et al. | |
| 7,241,496 B2 | 7/2007 | Chen et al. | |
| 2002/0106470 A1* | 8/2002 | Merziger et al. | ......... 428/36.91 |
| 2003/0104150 A1* | 6/2003 | Bonnet et al. | .............. 428/35.7 |

\* cited by examiner

*Primary Examiner*—William K Cheung
(74) *Attorney, Agent, or Firm*—Steven D. Boyd

(57) ABSTRACT

The invention relates to a polymer material comprising 99 to 20 parts by weight of polymer(s), 0.1 to 80 parts by weight of carbon nanotubes, and 0.05 to 80 parts by weight of at least one type of dispersant selected from A-B-C, B-C and/or C-B-C block copolymers, wherein each block is bonded to the other by means of a covalent bond, C is a chemical and/or physical interaction with the polymer material and in preferably is miscible therwith, B is not miscible with the polymer material and with the block B and the glass transition temperature thereof. $T_g$ is less than the polymer material use temperature, A is not miscible with the polymer material and with the blocks B and the block C and the $T_g$ or the fusion temperature Tf is greater than the $T_g$ of B.

24 Claims, No Drawings

POLYMER MATERIALS CONTAINING DISPERSED CARBON NANOTUBES

This U.S. patent application is a National Stage of the PCT application of PCT/FR2006/000708 filed Mar. 31, 2006.

TECHNICAL FIELD

The present invention relates to polymer materials containing carbon nanotubes.

Owing to their very high mechanical properties and the very high length/diameter ratio, carbon nanotubes (CNTs) are materials offering substantial advantages as reinforcing agents. In addition, their electrical and thermal properties also allow them to be used to modify the conducting properties of the materials into which they are incorporated.

Carbon nanotubes are made up from graphite sheets wound up and terminated by hemispheres consisting of pentagons and hexagons having a structure similar to fullerenes.

Nanotubes are known to be composed either of a single sheet, in which case they are called SWNTs (single-walled nanotubes), or made up from several concentric sheets, when they are called MWNTs (multi-walled nanotubes), SWNTs being in general more difficult to manufacture than MWNTs.

PRIOR ART

EP 692 136 has disclosed polymer compositions containing up to 20% by weight of CNT. These compositions, which are thermoplastic or thermosetting, are prepared by melt blending the polymers with the CNTs. However, it has been found that the dispersion of the CNTs within the polymer matrix is not uniform and the expected mechanical and/or electrical properties are insufficient.

There is an unsatisfied demand for improving the way in which the CNTs are dispersed within the polymer materials into which they are incorporated, so as to obtain more uniform materials.

EP 1 359 121 and EP 1 359 169 propose to improve the dispersion of CNTs in polymer matrices by functionalizing the CNTs.

SUMMARY OF THE INVENTION

The present invention relates to a polymer material comprising:
- 99 to 20 parts by weight of polymer(s);
- 0.1 to 80 parts by weight of carbon nanotubes; and
- 0.05 to 80 parts by weight of at least one dispersant chosen from A/B/C, B/C and/or C/B/C block copolymers in which:
  - each block is linked to another by means of a covalent bond or an intermediate molecule linked to one of the blocks via a covalent bond and to the other block via another covalent bond,
  - C provides an interaction of the chemical and/or physical type with the polymer material and is preferably miscible with the said material,
  - B is not miscible with the polymer material and with the block C, and its glass transition temperature $T_g$ is below the usage temperature of the polymer material and
  - A is not miscible with the polymer material, the block B and the block C, and its $T_g$ or its melting point $T_m$ is above the $T_g$ of B.

The term "polymer(s)" is understood throughout the following to mean any composition based on one or more polymers of any type: thermoplastic or thermosetting, rigid or elastomeric, amorphous, crystalline and/or semicrystalline, homopolymer, copolymer, etc.; these compositions may be blends of one or more different polymers, with various additives, adjuvants and/or fillers conventionally added to polymers, such as stabilizers, plasticizers, polymerization catalysts, dyes, pigments, lubricants, fire retardants, reinforcements and/or fillers, polymerization solvents, etc.

The polymers may be polymers containing functional groups of the epoxide and/or glycidyl or ether type, of the monocarboxylic, dicarboxylic or polycarboxylic acid type, whether saturated or unsaturated, whether aromatic or non-aromatic, or an acid-derived functional group, such as an anhydride, ester, amide and/or imide, of the vinyl, vinylaromatic type, etc., it being understood that the definitions of the polymers given below may be redundant in so far as certain polymers contain several of the functional groups listed above.

Thermosetting polymers are in general defined as being formed from polymer chains of variable length linked together by covalent bonds so as to form a three-dimensional network.

As an example, mention may be made of cyanoacrylates, bismaleimides and epoxy resins crosslinked by a hardener or cure agent.

Among cyanoacrylates, mention may be made of 2-cyanoacrylic esters, which are thermosetting materials obtained by the polymerization of the monomer $CH_2=C(CN)COOR$ with various possible groups R (without the need to add a hardener).

Thermosetting formulations of the bismaleimide type are, for example:

methylenedianiline+benzophenone dianhydride+nadic imide;

methylenedianiline+benzophenone dianhydride+phenylacetylene;

methylenedianiline+maleic anhydride+maleimide.

Advantageously, the thermosetting material derives from the reaction of a thermosetting epoxy resin and a hardener. It is also defined as being any product resulting from the reaction of an oligomer carrying oxirane functional groups with a hardener. What is obtained from the reactions involved during the reaction of these epoxy resins is a crosslinked material corresponding to a three-dimensional network of greater or lesser density depending on the base characteristics of the resins and hardeners employed.

The expression "epoxy-type polymer" is understood to mean any organic compound possessing at least two oxirane-type functional groups, which can polymerize by ring opening. The term "epoxy polymers" denotes all the usual epoxy resins that are liquid at room temperature (23° C.) or at a higher temperature. These epoxy resins may on the one hand be monomeric or polymeric and, on the other hand, aliphatic, cycloaliphatic, heterocyclic or aromatic. As examples of such epoxy resins, mention may be made of the diglycidyl ether of resorcinol, the diglycidyl ether of bisphenol A, triglycidyl-p-aminophenol, the diglycidyl ether of bromobisphenol F, the triglycidyl ether of m-aminophenol, tetraglycidyl methylene dianiline, the triglycidyl ether of (trihydroxyphenyl)methane, the polyglycidyl ethers of novolac phenol-formaldehyde, the polyglycidyl ethers of novolac orthocresol and the tetraglycidyl ethers of tetraphenylethane. Blends of at least two of these resins may also be used.

Epoxy resins possessing at least 1.5 oxirane functional groups per molecule, and more particular epoxy resins containing between 2 and 4 oxirane functional groups per molecule, are preferred. Epoxy resins possessing at least one aromatic ring, such as the diglycidyl ethers of bisphenol A, are also preferred.

With regard to the hardener, it is general practice to use as hardeners the epoxy resin hardeners that react at room temperature or at temperatures above room temperature. As nonlimiting examples, mention may be made of:
- acid anhydrides, among which is succinic anhydride;
- aromatic or aliphatic polyamines, among which are diaminodiphenyl sulphone (DDS), methylene dianiline and 4,4'-methylenebis(3-chloro-2,6-diethylaniline) (MCDEA);
- dicyandiamide and its derivatives;
- imidazoles;
- polycarboxylic acids; and
- polyphenols.

With regard to polymers having epoxide and/or glycidyl functional groups mention may also be made of copolymers of ethylene with at least one unsaturated epoxide, which may be obtained by the copolymerization of ethylene with one or more unsaturated epoxides or by grafting the unsaturated epoxide(s) onto polyethylene. The grafting may be carried out in a solvent phase or on polyethylene in the melt in the presence of a peroxide. These grafting techniques are known per se. As regards the copolymerization of ethylene with an unsaturated epoxide, radical polymerization processes normally operating at pressures between 200 and 2 500 bar may be used.

The term "polyethylene" is understood to mean ethylene homopolymers and copolymers.

By way of ethylene comonomers, mention may be made of:
- alpha-olefins, advantageously those having from 3 to 30 carbon atoms; by way of examples of alpha-olefins, mention may be made of propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-docoene, 1-tetracocene, 1-hexacocene, 1-octacocene and 1-triacontene; these alpha-olefins may be used separately or as a mixture of two or more of them;
- esters of unsaturated carboxylic acids, such as, for example, alkyl (meth)acrylates, the alkyls possibly having up to 24 carbon atoms; examples of alkyl acrylates or methacrylates are especially methyl methacrylate, ethyl acrylate, n-butyl acrylate, isobutyl acrylate and 2-ethylhexyl acrylate;
- vinyl esters of saturated carboxylic acids, such as, for example, vinyl acetate or vinyl propionate;
- dienes such as, for example, 1,4-hexadiene.

The polyethylene may include several of the above comonomers.

Advantageously, the polyethylene, which may be a blend of several polymers, comprises at least 50 mol % and preferably 75 mol % of ethylene and its density may be between 0.86 and 0.98 g/cm$^3$. The MFI (Melt Flow Index at 190° C./2.16 kg) is advantageously between 20 and 1000 g/10 min.

By way of example of polyethylenes, mention may be made of:
- low-density polyethylene (LDPE);
- high-density polyethylene (HDPE);
- linear low-density polyethylene (LLDPE);
- very low-density polyethylene (VLDPE);
- polyethylene obtained by metallocene catalysis, that is to say polymers obtained by the copolymerization of ethylene and of an alpha-olefin such as propylene, butene, hexene or octene in the presence of a single-site catalyst generally consisting of a zirconium or titanium atom and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methylaluminoxane (MAO). Hafnium may also be used as the metal to which the cyclopentadiene is fixed. Other metallocenes may include transition metals of IV A, V A and VI A. Metals from the series of lanthamides may also be used;
- EPR (ethylene-propylene-rubber) elastomers;
- EPDM (ethylene-propylene-diene) elastomers;
- blends of polyethylene with an EPR or an EPDM; and
- ethylene-alkyl (meth)acrylate copolymers possibly containing up to 60%, and preferably 2 to 40%, by weight of (meth)acrylate.

Grafting is an operation known per se.

By way of example of unsaturated epoxides, mention may be made of:
- aliphatic glycidyl esters and ethers, such as allyl glycidyl ether, vinyl glycidyl ether, glycidyl maleate, glycidyl itaconate, glycidyl acrylate and glycidyl methacrylate; and
- alicyclic glycidyl esters and ethers, such as 2-cyclohex-1-ene glycidyl ether, diglycidyl cyclohexene-4-5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

The polymers having epoxide and/or glycidyl functional groups also comprise the polymers listed above, some of the monomer or monomers having epoxide and/or glycidyl functional groups of which is replaced with unsaturated monomers that can be copolymerized with the monomers having epoxide and/or glycidyl functional groups, and especially (meth)acrylic esters, such as for example ethylene/methyl methacrylate/glycidyl (meth)acrylate terpolymers.

Thus, the polymer having epoxide and/or glycidyl functional groups may advantageously be an ethylene/alkyl (meth)acrylate/unsaturated epoxide copolymer. Advantageously, it may contain up to 40%, preferably 5 to 40%, by weight of alkyl (meth)acrylate and up to 10%, preferably 0.1 to 8%, by weight of unsaturated epoxide. Advantageously, the epoxide is glycidyl (meth)acrylate.

Advantageously, the alkyl (meth)acrylate is chosen from methyl (meth)acrylate, ethyl acrylate, n-butyl acrylate, isobutyl acrylate and 2-ethylhexyl acrylate. The amount of alkyl (meth)acrylate is advantageously from 20 to 35%. The MFI is advantageously between 5 and 100 (in g/10 min. at 190° C./2.16 kg) and the melting point is between 60 and 110° C. This copolymer may be obtained from the radical polymerization of the monomers.

Among commercial polymers having epoxide functional groups, mention may for example be made of LOTADER® GMA (an ethylene/methyl methacrylate/glycidyl methacrylate terpolymer) sold by Arkema.

With regard to polymers having acid and/or acid anhydride functional groups, mention may be made of polyolefins grafted by an unsaturated carboxylic acid anhydride, and also copolymers of an olefin with an unsaturated carboxylic acid anhydride obtained for example by radical polymerization, and more particularly those based on ethylene, as defined above.

The unsaturated carboxylic acid anhydride may be chosen from maleic, itaconic, citraconic, allylsuccinic, cyclohex-4-ene-1,2-dicarboxylic, bicyclo-[2.2.1]hept-5-ene-2,3-dicarboxylic, 4-methylenecyclohex-4-ene-1,2-dicarboxylic, and x-methylbicyclo[2.2.1]hept-5-ene-2,2-dicarboxylic anhydrides. Advantageously, maleic anhydride is used. It would not be outside the scope of the invention to replace all or part of the anhydride with one or more unsaturated carboxylic acids such as, for example, (meth)acrylic acid.

With regard to copolymers of ethylene with an unsaturated carboxylic acid anhydride, that is to say those in which the unsaturated carboxylic acid anhydride is not grafted, these are copolymers of ethylene with an unsaturated carboxylic acid anhydride and optionally with another monomer that may be chosen from the comonomers mentioned above for the ethylene copolymers intended to be grafted.

Advantageously, ethylene/maleic anhydride and ethylene/alkyl (meth)acrylate(s)/maleic anhydride copolymers are used. These copolymers comprise in general 0.2 to 10% by weight of maleic anhydride and 0 to 40%, preferably 5 to 40%, by weight of alkyl (meth)acrylate. Their MFI is between 20 and 100 (190° C.-2.16 kg). The alkyl (meth)acrylates have already been described above. The melting point is between 80 and 120° C.

Such copolymers are commercially available and are prepared by radical polymerization at a pressure that may be between 200 and 2500 bar, the copolymers being sold in granule form. They may be powdered, for example by microgranulation using the underwater cutting technique of the company GAL4 (Virginia, USA), or by cryogenic grinding.

With regard to polymers having acid-derived functional groups of the ester type, mention may be made of polymers of the (alkyl)acrylate type or acrylic polymers, homopolymers and copolymers of one or more alkyl (alkyl)acrylates, which are described in particular in Kirk Othmer, Encyclopedia of Chemical Technology, 4th Edition, Vol. 1, pages 292-293 and Vol. 16, pages 475-478. Mention may also be made of copolymers of one or more alkyl (alkyl)acrylates and of at least one monomer chosen from acrylonitrile, butadiene, styrene and isoprene, provided that the proportion of alkyl (alkyl)acrylates is at least 50 mol %.

With regard to polymers having acid-derived functional groups of the ester type, mention may also be made of polymers containing units derived from one or more vinyl esters of saturated carboxylic acids, such as for example vinyl acetate and vinyl propionate. For example, ethylene and vinyl acetate copolymers may be mentioned, especially those sold under the names EVATANE®, ELVAX® and ULTRATHENE®.

With regard to polymers having amide functional groups, mention may be made of polymers resulting from the condensation:
- of one or more amino acids, such as aminocaproic, 7-aminoheptanoic, 11-aminoundecanoic (PA-11) and 12-aminododecanoic (PA-12) acids, or of one or more lactams, such as caprolactam (PA-6), oenantholactam and lauryllactam;
- of one or more salts or mixtures of diamines, such as hexamethylenediamine, dodecamethylenediamine, metaxylylenediamine, bis(p-aminocyclohexyl)methane and trimethylhexamethylenediamine with diacids, such as isophthalic, terephthalic, adipic, azelaic, suberic, sebacic and dodecanedicarboxylic acids;
- or of mixtures of certain of these monomers, resulting in copolyamides, for example PA-6/12 by the condensation of caprolactam and lauryllactam.

As examples of aliphatic polyamides resulting from the condensation of an aliphatic diamine having 6 to 12 carbon atoms and of an aliphatic diacid having 9 to 12 carbon atoms, mention may be made of:
PA-6, 12 resulting from the condensation of hexamethylenediamine and 1,12-dodecanedioic acid.

As examples of aliphatic polyamides resulting from the condensation of an aliphatic diamine having 6 to 12 carbon atoms and an aliphatic diacid having 9 to 12 carbon atoms, and amino acids, mention may be made of:
PA-6/6, 6/12 resulting from the condensation of caprolactam and hexamethylenediamine and adipic acid and lauryllactam.

The polymer having amide functional groups may be plasticized. As regards plasticizers, these are generally chosen from benzene sulphonamide derivatives, such as n-butylbenzene sulphonamide (BBSA), ethyltoluene sulphonamide or N-cyclohexyl toluene sulphonamide; esters of hydroxybenzoic acids, such as 2-ethylhexyl parahydroxybenzoate and 2-decylhexyl parahydroxybenzoate; esters or ethers of tetrahydrofurfuryl alcohol, such as oligoethyleneoxytetrahydrofurfuryl alcohol; and esters of citric acid or hydroxy malonic acid, such as oligoethyleneoxy malonate. A particularly preferred plasticizer is n-butylbenzene sulphonamide (BBSA). The plasticizer(s) may be introduced into the polyamide during polycondensation or subsequently. The proportion of plasticizer may in general range up to 30% by weight of the polymer having amide functional groups.

The polymer having amide functional groups may also be a copolymer having polyamide blocks and polyether blocks (PEBA) resulting from the copolycondensation of polyamide blocks having reactive end groups with polyether blocks having reactive end groups, such as, inter alia:
1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated alpha,omega-polyoxyalkylene blocks called polyetherdiols;
3) polyamide blocks having dicarboxylic chain ends with polyetherdiols, the products obtained being, in this particular case, polyetheresteramides.

Polyamide blocks having dicarboxylic chain ends derive, for example, from the condensation of polyamide precursors in the presence of a chain-stopping dicarboxylic acid.

Polyamide blocks having diamine chain ends derive, for example, from the condensation of polyamide precursors in the presence of a chain-stopping diamine.

The polymers having polyamide blocks and polyether blocks may also include randomly distributed units. These polymers may be prepared by the simultaneous reaction of the polyether and the precursors for the polyamide blocks. For example, it is possible to make a polyether diol, polyamide precursors and a chain-stopping diacid react together. What is obtained is a polymer having essentially polyether blocks and polyamide blocks of very variable length, but also the various reactants that have reacted randomly, which are distributed randomly along the polymer chain.

It is also possible to make a polyether diamine, polyamide precursors and a chain-stopping diacid react together. What is obtained is a polymer having essentially polyether blocks and polyamide blocks of very variable length, but also the various reactants that have reacted randomly, which are randomly distributed along the polymer chain.

The amount of polyether blocks in these copolymers having polyamide blocks and polyether blocks represents in general 10 to 70% by weight of the copolymer.

The polyetherdiol blocks are either used as such and copolycondensed with polyamide blocks having carboxylic ends or they are aminated in order to be converted into polyetherdiamines and condensed with polyamide blocks having carboxylic ends. They may also be blends with polyamide precursors and a diacid chain stopper in order to make polymers having polyamide blocks and polyether blocks with units distributed randomly.

Among commercial polymers having amide functional groups, mention may be made for example of NYLON GRILAMID® and RILSAN®, which are aliphatic polyamides, and PEBAX® and VESTAMID®, which are PEBAs.

With regard to polyurethanes, these are formed from soft polyether blocks, which are residues of polyetherdiols, and from hard blocks (polyurethanes), which result from the reaction of at least one diisocyanate with at least one short diol. The chain-extending short diol may be chosen from the glycols mentioned above in the description of polyetheresters. The polyurethane blocks and the polyether blocks are linked via bonds resulting from the reaction of the isocyanate functional groups with the OH functional groups of the polyetherdiol.

Mention may also be made of polyester urethanes for example those comprising diisocyanates units, units derived from amorphous polyester diols, and units derived from a short chain-extending diol. They may contain plasticizers.

As examples of commercial thermoplastic polyurethanes, mention may be made of ELASTOLLAN® from Elastogran Bayer.

With regard to polymers having ether functional groups, mention may be made of polyoxyalkylenes and especially polyoxymethylene (POM), copolymers having poly(propylene oxide-ethylene oxide) blocks and polyphenylene oxide (PPO).

Mention may also be made of polyalkylene glycols, which are polyethers terminated by hydroxyl functional groups, such as polyethylene glycol (PEG), polypropylene glycol, polytetramethylene glycol (PTMG), and also polyetheresters, which are copolymers having polyester blocks and polyether blocks. They are formed from soft polyether blocks, which are the residues of polyether diols, and from hard segments (polyester blocks), which result from the reaction of at least one dicarboxylic acid with at least one short chain-extending diol unit. The polyester blocks and the polyether blocks are linked via ester links resulting from the reaction of the acid functional groups of the acid with the OH functional groups of the polyether diol. The short chain-extending diol may be chosen from the group consisting of neopentyl glycol, cyclohexanedimethanol and aliphatic glycols of formula $HO(CH_2)_nOH$ in which n is an integer ranging from 2 to 10. Advantageously, the diacids are aromatic dicarboxylic acids having 8 to 14 carbon atoms. Up to 50 mol % of the aromatic dicarboxylic acid may be replaced with at least one other aromatic dicarboxylic acid having 8 to 14 carbon atoms and/or up to 20 mol % may be replaced with an aliphatic dicarboxylic acid having 2 to 12 carbon atoms.

As examples of aromatic dicarboxylic acids, mention may be made of terephthalic acid, isophthalic acid, bibenzoic acid, naphthalene dicarboxylic acid, 4,4'-diphenylenedicarboxylic acid, bis(p-carboxyphenyl)methane, ethylene bis(p-benzoic) acid, 1,4-tetramethylene bis(p-oxybenzoic) acid, ethylene bis (para-oxybenzoic) acid and 1,3-trimethylene bis(p-oxybenzoic) acid. As examples of glycols, mention may be made of ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol and 1,4-cyclohexanedimethanol. Copolymers having polyester blocks and polyether blocks are for example copolymers having polyether units derived from polyether diols, such as PEG, PPG and PTMG, dicarboxylic acid units, such as terephthalic acid, and glycol units (ethanediol or 1,4-butanediol). The chain linking of the polyethers and diacids forms the soft segments, whereas the chain linking of the glycol of the butanediol with the diacids forms the hard segments of the copolyetherester. Such copolyetheresters are for example described in the patents EP 402 883 and EP 405 227. These polyetheresters are thermoplastic elastomers, and they may contain plasticizers.

Among commercial polymers having ether functional groups, mention may be made for example of ALCON® and HOSTAFORM, which are POMs, ARNITEL®, HYTREL® and LOMOD®, which are block polyetheresters, and PEBAX® and VESTAMID®, which are block polyetheresteramides.

With regard to polymers having vinyl functional groups, these are polymers, both homopolymers and copolymers, which derive in particular from vinyl monomers, such as vinyl chloride. As examples of vinyl polymers, mention may be made of polyvinyl chloride (PVC), chlorinated PVC, etc.

With regard to polymers having vinylaromatic functional groups, these are polymers, both homopolymers and copolymers, which derive in particular from ethylenically unsaturated aromatic monomers, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2-,6-dichlorostyrene and 1-vinylnaphthalene. As examples of styrene polymers, mention may be made of polystyrene (PS), elastomer-modified PS, styrene/acrylonitrile (SAN) copolymers, elastomer-modified SAN, in particular ABS, which is obtained for example by grafting (graft polymerization) of styrene and acrylonitrile onto a polybutadiene or butadiene-acrylonitrile copolymer backbone, SAN/ABS blends, poly(alpha-methylstyrene) and polychlorostyrene.

The abovementioned elastomers may for example be EPR (the usual abbreviation for ethylene-propylene rubber or ethylene-propylene elastomer), EPDM (the usual abbreviation for ethylene-propylene-diene monomer rubber or ethylene-propylene-diene monomer elastomer), polybutadiene, acrylonitrile/butadiene copolymer, polyisoprene and isoprene/acrylonitrile copolymer.

The impact PS may be obtained (i) either by blending PS with elastomers, such as polybutadiene, butadiene/acrylonitrile copolymers, polyisoprene or isoprene/acrylonitrile copolymers (ii) or more usually by grafting styrene (by graft polymerization) onto a polybutadiene or butadiene/acrylonitrile copolymer backbone.

The styrene polymers also comprise the polymers listed above, some of the styrene monomer or monomers of which are replaced with unsaturated monomers that can be copolymerized with the styrene monomers, and especially (meth) acrylic esters.

As examples of styrene copolymers, mention may be made of styrene/chlorostyrene copolymers, styrene/propylene copolymers, styrene/butadiene copolymers, styrene/isoprene copolymers, styrene/vinyl chloride copolymers, styrene/vinyl acetate copolymers, styrene/alkyl acrylate (methyl acrylate, ethyl acrylate, butyl acrylate, octyl acrylate, phenyl acrylate, etc.) copolymers, styrene/alkyl methacrylate (methyl methacrylate, ethyl methacrylate, butyl methacrylate, octyl methacrylate, phenyl methacrylate, etc.) copolymers, styrene/methyl chloroacrylate copolymers and styrene/acrylonitrile/alkyl(meth)acrylate copolymers. In these copolymers, the comonomer(s) content will generally be up to 20% by weight.

Among commercial polymers having vinylaromatic functional groups, mention may for example be made of FINAPRENE® (SBS &SBR), KRALON® (ABS), KRATON® (SBS & SEBS), LACORAN® (ABS), LACQRENE® (PS and impact-modified PS), LACQSAN® (SAN) and DYLARC® (SMA) (poly(styrene-co-maleic anhydride) with a low maleic anhydride content and poly(styrene-co-maleic anhydride) with a high maleic anhydride content).

Mention may also be made of functionalized polyolefins carrying at least one carboxylic acid or carboxylic acid anhydride functional group.

The functionalized polyolefins may be unfunctionalized polyolefin polymers with reactive units (the functionalities). The unfunctionalized polyolefins are conventionally homopolymers or copolymers of alpha-olefins or of diolefins, such as for example ethylene, propylene, 1-butene, 1-octene and butadiene. By way of examples, mention may be made of:

ethylene homopolymers and copolymers, particularly LDPE, HDPE, LLDPE (linear low-density polyethylene), VLDPE (very low-density polyethylene) and metallocene polyethylene;

propylene homopolymers and copolymers;

ethylene/alpha-olefin copolymers such as ethylene/propylene copolymers; EPRs (abbreviation for ethylene-propylene rubbers); and ethylene/propylene/diene copolymers (EPDM);

styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS);

copolymers of ethylene with at least one product chosen from salts or esters of unsaturated carboxylic acids such as alkyl (meth)acrylate (for example methyl acrylate), or vinyl esters of saturated carboxylic acids such as vinyl acetate, the proportion of comonomer(s) possibly being as much as 40% by weight;

blends of at least two of the abovementioned polyolefins, for example a polypropylene blended with an EPR or EPDM copolymer, it being possible for the latter to be optionally plasticized or crosslinked during blending.

Advantageously, the unfunctionalized polyolefins are chosen from propylene homopolymers or copolymers and any ethylene homopolymer or copolymer and a comonomer of alpha-olefin type, such as propylene, butene, hexene, octene or 4-methyl-1-pentene. Mention may be made, for example, of PP, high-density PE, medium-density PE, linear low-density PE, low-density PE and very low-density PE. These polyethylenes are known to those skilled in the art as being produced by a "radical" process, by "Ziegler"-type catalysis or, more recently, by so-called "metallocene" catalysis.

The unfunctionalized polyolefins may also be chosen from amorphous poly(alpha-olefins) (APAOs). Preferably, APAOs derived from ethylene, propylene, butene or hexene are used. Advantageously, either ethylene propylene butene copolymers with a high butene content, or ethylene propylene butene copolymers with a high propylene content, or butene homopolymers or copolymers are used.

The reactive units or functionalities are acid or anhydride functional groups. By way of example, mention may be made of the above polyolefins grafted or copolymerized or terpolymerized by carboxylic acids or the corresponding salts or esters such as (meth)acrylic acid, or else by carboxylic acid anhydrides such as maleic anhydride. A functionalized polyolefin is, for example, a PE/EPR blend, the weight ratio of which may vary between wide limits, for example between 40/60 and 90/10, the said blend being cografted with an anhydride, especially maleic anhydride, with a degree of grafting, for example, of 0.01 to 5% by weight.

The functionalized polyolefins may be chosen from the following (co)polymers, grafted with maleic anhydride, in which the degree of grafting is, for example, from 0.01 to 5% by weight:

PE, PP, copolymers of ethylene with propylene, butene, hexene, or octene and containing, for example, from 35 to 80% by weight of ethylene;

ethylene/alpha-olefin copolymers such as ethylene/propylene copolymers; EPRs (abbreviation for ethylene-propylene rubbers); and ethylene/propylene/diene copolymers (EPDM);

styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS);

ethylene/vinyl acetate copolymers (EVA), containing up to 40% by weight of vinyl acetate;

ethylene/alkyl (meth)acrylate copolymers, containing up to 40% by weight of alkyl (meth)acrylate;

ethylene/vinyl acetate (EVA)/alkyl (meth)acrylate terpolymers, containing up to 40% by weight of comonomers.

The functionalized polyolefin may also be a copolymer or terpolymer of ethylene and at least one of the following monomers: an alkyl (meth)acrylate or a vinyl ester of a saturated carboxylic acid and an anhydride such as maleic anhydride or (meth)acrylic acid.

By way of examples of functionalized polyolefins of this latter type, mention may be made of the following copolymers, in which the ethylene preferably represents at least 60% by weight and in which the termonomer (the functional group) represents, for example, from 0.1 to 10% by weight of the copolymer:

ethylene/alkyl (meth)acrylate/(meth)acrylic acid or maleic anhydride copolymers;

ethylene/vinyl acetate/maleic anhydride copolymers;

ethylene/vinyl acetate or alkyl (meth)acrylate/(meth) acrylic acid or maleic anhydride copolymers.

In the foregoing, the term "alkyl (meth)acrylate" denotes $C_1$ to $C_{12}$ alkyl methacrylates and acrylates, and may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

The functionalized or unfunctionalized olefin copolymers mentioned above may be copolymerized so as to form random or block copolymers and may have a linear or branched structure.

The molar mass, the MFI index and the density of these polyolefins may also vary over a wide range, as those skilled in the art will appreciate. The MFI, the usual abbreviation for Melt Flow Index, is measured according to the ASTM 1238 standard.

Advantageously, the functionalized polyolefins are chosen from any polymer comprising alpha-olefin units and units carrying polar reactive functional groups such as carboxylic acid or carboxylic acid anhydride functional groups. By way of examples of such polymers, mention may be made of ethylene/alkyl acrylate/maleic anhydride terpolymers, such as certain LOTADER® polymers sold by Arkema or maleic-anhydride-grafted polyolefins such as certain OREVAC® polymers sold by Arkema, as well as ethylene/alkyl acrylate/ (meth)acrylic acid terpolymers or ethylene/vinyl acetate/maleic anhydride terpolymers such as certain OREVAC® polymers sold by Arkema.

Mention may also be made of fluoropolymers corresponding to polymers having, in their chain, at least one monomer chosen from compounds that contain a vinyl group capable of opening in order to be polymerized and that contain, directly attached to this vinyl group, at least one fluorine atom, a fluoroalkyl group or a fluoroalkoxy group.

As examples of monomers, mention may be made of vinyl fluoride; vinylidene fluoride (VF2); trifluoroethylene (VF3); chlorotrifluoroethylene (CTFE); 1,2-difluoroethylene; tetrafluoroethylene (TFE); hexafluoropropylene (HFP); perfluoro(alkyl vinyl)ethers, such as perfluoro(methyl vinyl) ether (PMVE), perfluoro(ethyl vinyl)ether (PEVE) and perfluoro(propyl vinyl)ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F, CO_2H, CH_2OH, CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_z$ and z is 1, 2, 3 or 4; the product of formula $R_3OCF=CH_2$ in which $R_3$ is $F(CF_2)_z$— and z is 1, 2, 3 or 4; perfluorobutylethylene (PFBE); 3,3,3-trifluoropropene and 2-trifluoromethyl-3,3,3-trifluoro-1-propene.

Among the fluoropolymers listed above, vinylidene fluoride homopolymers and copolymers are preferred.

As examples of polymers falling within the compositions according to the invention, mention may most particularly be made of LOTADER®, LOTRYL®, EVATANE®, ELVALLOY®, OREVAC®, PEBAX® and RILSAN®, sold by Arkema, and also HYTREL®, sold by DuPont, and NORYL® polymers sold by GE Plastics, but also compounds filled with wood and/or lignine based on at least one of these polymers and/or at least one polyolefin within the meaning given above.

The carbon nanotubes employed may be of any type: CNT, MWNT, SWNT, whether functionalized or not.

Preferably, the carbon nanotubes have a form factor (L/D) of 5 or higher, and preferably 50 or higher and advantageously 100 or higher.

Advantageously, the carbon nanotubes have a diameter of between 0.4 and 50 nm and a length of between 100 and 100 000 times their diameter.

According to a preferred embodiment of the invention, the carbon nanotubes are in the form of multiple-walled nanotubes (MWNTs), their diameter being between 5 and 30 nm and their length being 0.3 μm or higher.

The quantity of carbon nanotubes advantageously represents 0.1 to 30 parts by weight and advantageously 0.5 to 20 parts by weight of the total mass of the polymer material.

With regard to the B/C diblock, C may be obtained by the polymerization of at least one monomer chosen from the group containing styrene and short-chain methacrylates, such as methyl methacrylate. Preferably, C consists of methyl methacrylate monomers or contains at least 50% by weight of methyl methacrylate, preferably at least 75% by weight of methyl methacrylate. The other monomers constituting the block C may or may not be acrylic monomers, and these may or may not be reactive. The term "reactive monomer" is understood to mean a chemical group capable of reacting with at least one of the functional groups of the polymer(s) or with the chemical groups of the hardener, if the polymer(s) is (are) of the thermosetting type and contains (contain) a hardener. As non-limiting examples of reactive functional groups, mention may be made of oxirane functional groups, amine functional groups, an hydride functional groups and carboxylic acid functional groups. The reactive monomer may be (meth)acrylic acid or any other hydrolyzable monomer resulting in these acids. Among the other monomers that may constitute the block C, mention may be made by way of non-limiting example of glycidyl (meth)acrylate and tert-butyl (meth)acrylate. Advantageously C consists of PMMA syndiotactic to at least 60%.

Advantageously the $T_g$ of B is below 0° C. and preferably below −20° C.

The monomer used to synthesize the elastomeric block B may be a diene chosen from butadiene, isoprene, 2,3-dimethyl-1,3-butadiene, 1,3-pentadiene and 2-phenyl-1,3-butadiene. Advantageously, B is chosen from polydienes, especially polybutadiene, polyisoprene and their random copolymers, or else from partially or completely hydrogenated polydienes. Among polybutadienes, it is advantageous to use those whose $T_g$ is the lowest, for example 1,4-polybutadiene with a $T_g$ (at around −90° C.) below that of 1,2-polybutadiene (around 0° C.). The blocks B may also be hydrogenated. This hydrogenation is carried out using standard techniques.

The monomer used to synthesize the elastomeric block B may also be an alkyl (meth)acrylate, the following polymers being obtained with the $T_g$ given in brackets after the name of the acrylate: ethyl acrylate (−24° C.), butyl acrylate (−54° C.), 2-ethylhexyl acrylate (−85° C.), hydroxyethyl acrylate (−15° C.) and 2-ethylhexyl methacrylate (−10° C.). Advantageously, butyl acrylate is used. The acrylates are different from those of the block C in order to satisfy the condition that B and C are not miscible.

Preferably, the blocks B consist mostly of poly(1,4-butadiene).

The diblock B/C has a number-average molar mass that may be between 10 000 g/mol and 500 000 g/mol, preferably between 20 000 and 200 000 g/mol. Advantageously, the diblock B/C has a mass fraction C of between 5 and 95% and preferably between 15 and 85%.

With regard to the triblock C/B/C, C is in general formed from the same monomers and optionally copolymers as the block C of the diblock B/C. The two blocks C of the triblock C/B/C may be identical or different. They may also differ by their molar mass, but be formed from the same monomers. The blocks C of the triblocks C/B/C may be identical or different from the block C of the diblock B/C. The block B is formed from the same monomers and optionally comonomers as the block B of the diblock B/C. The blocks B of the triblock C/B/C and the diblock B/C may be identical or different.

The triblock C/B/C has in general a number-average molar mass that may be between 10 000 g/mol and 500 000 g/mol, preferably between 20 000 and 200 000 g/mol. Advantageously, the triblock C/B/C has the following compositions in terms of C and B expressed as mass fractions, the total being 100%:

C: between 10 and 80%, preferably between 15 and 70%;
B: between 90 and 20%, preferably between 85 and 30%.

With regard to the triblock A/B/C, C consists of the same monomers and optionally comonomers as the block C of the diblock B/C. The block C of the triblock A/B/C, each block C of the triblock C/B/C, and the block C of the diblock B/C may be identical or different. The block B consists of the same monomers and optionally comonomers as the block B of the diblock B/C. The blocks B of the triblock A/B/C, of the triblock C/B/C and of the diblock B/C may be identical or different.

The $T_g$ or $T_m$ of A is advantageously above 23° C. and preferably above 50° C. As examples of blocks A, mention may be made of those that derive from vinylaromatic compounds, such as styrene, α-methyl styrene and vinyltoluene, and those that derive from alkyl esters of acrylic and/or methacrylic acids having 1 to 18 carbon atoms in the alkyl chain. In the latter case, the acrylates differ from those of the block C in order to satisfy the condition that A and C are immiscible.

The triblock A/B/C has a number-average molar mass that may in general be between 10 000 g/mol and 500 000 g/mol, preferably between 20 000 and 200 000 g/mol. Advantageously, the triblock A/B/C has the following composition, expressed as fractions by weight, the total being 100%:

C: between 10 and 80%, preferably between 15 and 70%;
B: between 2 and 80%, preferably between 5 and 70%;
A: between 10 and 88%, preferably between 15 and 85%.

The blocks A may be manufactured by any polymerization means and in particular by controlled radical polymerization. Controlled radical polymerization is known. Conventional radical polymerization techniques do not allow polymers and copolymers to be obtained with a controlled architecture, in particular because of the short lifetime of the radicals, their high reactivity and the lack of stereochemistry of the intermediate species. The expression "controlled radical polymerization" is understood to mean a conventional radical polymerization in which at least one of the steps chosen from initiation, propagation, termination and transfer is controlled. As an example of control, mention may be made of the reversible deactivation of the growing macroradicals. This reversible deactivation may be brought about by the addition of nitroxides into the reaction mixture. A persistent radical is for example the TEMPO (2,2,6,6-tetramethyl-1-piperidinyloxy) radical which scavenges macroradicals and generally results in homopolymers of very low polydispersivity, thus giving a living character to the radical polymerization. Mention may also be made of beta-phosphorylated molecules possessing a hydrogen in the alpha position of the nitroxide functional group.

The B/C, A/B/C and C/B/C block copolymers used as dispersing agents in the polymer materials of the present invention may be manufactured by anionic polymerization, for example using the methods described in patent applications EP 524 054 and EP 749 987, or by radical polymerization, and especially by controlled radical polymerization.

Advantageously, the proportion of dispersant is 1 to 35 parts by weight per 99 to 65 parts by weight of polymer(s) respectively.

Preferably, the proportion of dispersant is 8 to 32 parts by weight per 92 to 68 parts by weight of polymer(s) respectively.

According to one particular embodiment of the invention, the dispersant includes, in addition to one of the block copolymers C/B/C and A/B/C, at least one polymer chosen from core-shell copolymers (E), functionalized elastomers, A/B block copolymers and/or ATBN or CTBN reactive rubbers.

With regard to the diblock A/B, the blocks A and B are incompatible and are formed from the same monomers and possibly comonomers as the blocks A and the blocks B of the triblock A/B/C. The blocks A and B may be identical or different from the other blocks A and B present in the other block copolymers of the impact modifier in the thermosetting material.

The diblock A/B generally has a number-average molar mass that may be between 10 000 g/mol and 500 000 g/mol, preferably between 20 000 and 200 000 g/mol. Advantageously, the diblock A/B has a mass fraction of B of between 5 and 95%, preferably between 15 and 85%.

With regard to the core-shell copolymer (E), this is in the form of fine particles having an elastomer core and at least one thermoplastic shell, the particle size being generally less than 1 μm and advantageously between 50 and 500 nm. By way of example of the core, mention may be made of isoprene homopolymers or butadiene homopolymers, copolymers of isoprene with at most 30 mol % of a vinyl monomer and copolymers of butadiene with at most 30 mol % of a vinyl monomer. The vinyl monomer may be styrene, an alkylstyrene, acrylonitrile or an alkyl (meth)acrylate. Another core family consists of the homopolymers of an alkyl (meth)acrylate and the copolymers of an alkyl (meth)acrylate with at most 30 mol % of a vinyl monomer. The alkyl (meth)acrylate is advantageously butyl acrylate. The vinyl monomer may be styrene, an alkylstyrene, acrylonitrile, butadiene or isoprene. The core of the copolymer (A) may be completely or partly crosslinked. All that is required is to add at least difunctional monomers during the preparation of the core; these monomers may be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic acid and glycidyl methacrylate.

The shell(s) are styrene homopolymers, alkylstyrene homopolymers or methyl methacrylate homopolymers, or copolymers comprising at least 70 mol % of one of the above monomers and at least one comonomer chosen from the other above monomers, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate. By way of example, mention may be made of core-shell copolymers (E) having a polystyrene shell and core-shell copolymers (E) having a PMMA shell. There are also core-shell copolymers (E) having two shells, one made of polystyrene and the other, on the outside, made of PMMA. Examples of copolymers (E) and their method of preparation are described in the following patents: U.S. Pat. No. 4,180,494, U.S. Pat. No. 3,808,180, U.S. Pat. No. 4,096,202, U.S. Pat. No. 4,260, 693, U.S. Pat. No. 3,287,443, U.S. Pat. No. 3,657,391, U.S. Pat. No. 4,299,928 and U.S. Pat. No. 3,985,704.

Advantageously, the core represents, by weight, 70 to 90% of (A) and the shell represents 30 to 10%.

By way of example of a copolymer (E), mention may be made of that consisting (i) of 75 to 80 parts of a core comprising at least 93 mol % of butadiene, 5 mol % of styrene and 0.5 to 1 mol % of divinylbenzene and (ii) of 25 to 20 parts of two shells essentially of the same weight, the inner one made of polystyrene and the outer one made of PMMA.

According to a second particular embodiment of the invention, the dispersant comprises at least one A/B/C block copolymer and at least one A/B block copolymer. The impact modifier advantageously comprises between 5 and 80% of the diblock A/B per 95 to 20% of the triblock A/B/C.

Moreover, the advantage of these compositions is that it is unnecessary to purify the A/B/C after its synthesis. This is because the A/B/C triblocks are in general prepared from A/B diblocks, and the reaction often leads to a blend of A/B and A/B/C, which can then be separated in order to have S/B/M.

According to a third particular embodiment of the invention, the dispersant comprises at least one A/B/C block copolymer and at least one core-shell copolymer (E). The proportion of core-shell copolymer relative to A/B/C may be between 5 and 1 per 1 and 4, preferably between 3 and 1 per 1 and 2.

According to a fourth particular embodiment of the invention, the dispersant comprises at least one A/B/C block copolymer and at least one ATBN or CTBN reactive rubber. The proportion of reactive rubber relative to A/B/C may be between 5 and 1 per 1 and 4, and preferably between 3 and 1 per 1 and 2.

ATBN and CTBN are the respective abbreviations for:
 CTBN: carboxyl-terminated random butadiene/acrylonitrile copolymer;
 ATBN: amino-terminated random butadiene/acrylonitrile copolymer.

These products are oligomers based on butadiene and acrylonitrile and are terminated either by carboxyl functional groups or by amine functional groups. Butadiene has a very low $T_g$, this being favourable for obtaining good impact reinforcement.

According to one advantageous embodiment, part of the A/B/C triblock may be replaced with an A/B diblock. This part may be up to 70% by weight of the A/B/C triblock.

It would not be outside the scope of the invention to replace all or part of the A/B/C triblock with a C/A/B/A/C or C/B/A/B/C pentablock. They may be prepared by anionic polymerization, like the abovementioned diblocks or triblocks, but using a difunctional initiator. The number-average molar mass of these pentablocks lies within the same range as that of the A/B/C triblocks. The proportion of the two blocks C together or of the two blocks B or A together lies within the same range as the proportions of A, B and C in the A/B/C triblock.

Dispersants Particularly Preferred by the Applicant

ABC1: this is an A/B/C triblock copolymer in which A is polystyrene, B is polybutadiene and C is PMMA containing 22 wt % polystyrene, 9 wt % polybutadiene and 69 wt % polymethyl methacrylate, obtained by anionic polymerization in succession of a polystyrene block of 27 000 g/mol number-average molar mass, of a polybutadiene block of 11 000 g/mol mass and of a polymethyl methacrylate block of 84 000 g/mol number-average molar mass. This product was prepared according to the operating method described in EP 524 054 and in EP 749 987. This product has three glass transitions, one at −90° C., another at 95° C. and the third at 130° C.

ABC2: this is an A/B/C triblock copolymer in which A is polystyrene, B is polybutadiene and C is PMMA containing 12 wt % polystyrene, 18 wt % polybutadiene and 70 wt % polymethyl methacrylate, obtained by anionic polymerization in succession of a polystyrene block of 14 000 g/mol number-average molar mass, of a polybutadiene block of 22 000 g/mol mass and of a polymethyl methacrylate block of 85 000 g/mol number-average molar mass. This product was prepared according to the operating method described in EP 524 054 and in EP 749 987. This product has three glass transitions, one at −90° C., another at 95° C. and the third at 130° C.

ABC3: this is an A/B/C triblock copolymer in which A is polystyrene, B is polybutadiene and C is PMMA containing 24 wt % polystyrene, 26 wt % polybutadiene and 50 wt % polymethyl methacrylate, obtained by anionic polymerization in succession of a polystyrene block of 21 000 g/mol number-average molar mass, of a polybutadiene block of 22 000 g/mol mass and of a polymethyl methacrylate block of 43 000 g/mol number-average molar mass. This product was prepared according to the operating method described in EP 524 054 and in EP 749 987. This product has three glass transitions, one at −90° C., another at 95° C. and the third at 130° C.

ABC4: this is an A/B/C triblock copolymer in which the blocks A and C are identical, both being PMMA, and the block B is a butyl acrylate homopolymer. This polymer is obtained by controlled radical polymerization. The number-average molar mass of butyl acrylate is 22 000 g/mol and the weight-average molar mass of the total copolymer is 140 000 g/mol.

ABC5: this is an A/B/C triblock copolymer in which the blocks A and C are identical, both being methyl methacrylate (MMA)/dimethylacrylamide (DMA) copolymers, and the block B is a butyl acrylate homopolymer.

As examples:
 for polymer materials based on PA, PPE/PA, PS, ABS, PMMA and PC, the dispersants of ABC1 to ABC3 type are particularly preferred by the Applicant;
 for epoxy-based polymer materials, the dispersants of ABC1 to ABC5 type are particularly preferred by the Applicant; and
 for PVDF-based polymer materials, the dispersants of ABC1 to ABC3 or ABC4 type are particularly preferred by the Applicant.

The mixing method may use various technologies, such as those used for rubbers, polymers and liquids, depending on the nature of the polymers present in the final compound. Mention may be made of internal mixers, single-screw or twin-screw extruders, Buss co-kneaders, Ultraturax-type mixers, ultrasonic mixers or any type of mixing tool known to those skilled in the art.

The compositions described above may be obtained directly by mixing one or more polymer materials, one or more dispersants and CNTs or by dilution via the use of a masterbatch as described in WO 91/03057 or U.S. Pat. No. 5,646,990, EP 692 136 or U.S. Pat. No. 5,591,382, U.S. Pat. No. 5,643,502 or U.S. Pat. No. 5,651,922 and U.S. Pat. No. 6,221,283.

The masterbatches may be formed from CNTs and one or more dispersants, or else they may contain a certain amount of polymer material, the dilution resin not necessarily being the same as that used in the composition of the masterbatch.

In the case of thermosetting polymer materials, depending on the amount of dispersant used, it is possible to reproduce the operating conditions described in WO 91/01 92415 by simply adding the CNTs into the reaction mixture.

The thermosetting materials according to the invention with a low percentage of dispersant(s) (<10 parts by weight) may be prepared using a conventional stirred reactor. The thermosetting polymer is introduced into the reactor and heated for a few minutes at a temperature sufficient for it to be fluid. The dispersant, comprising the block copolymer(s) is then added and mixed at a temperature sufficient for it to be fluid, until it has completely dissolved. The mixing time depends on the nature of the copolymer added. The hardener is then added and mixed for a further 5 minutes at a temperature sufficient for it to be fluid, in order to obtain a uniform compound. The epoxy-hardener reaction starts during this compounding, and it must therefore be set as short as possible. These compounds are then cast into a mould and cured.

For thermosetting materials with a dispersant content of greater than 10 parts by weight, a premix consisting of the thermosetting resin and the dispersant containing about 10% by mass of impact modifier is produced using the following method: after having heated the thermosetting polymer at a temperature sufficient for it to be fluid for a few minutes, the dispersant is added and mixed at a temperature sufficient for it to be fluid, until it has completely dissolved. The mass of dispersant that remains in order to achieve the desired content is then mixed to this premix using for example a calender or a twin-screw mixer at a temperature sufficient for it to be fluid for one hour. The thermosetting resin/impact dispersant system obtained is then cooled and cryogenically ground, and the hardener is added. The final compound is pressed in a mould at the desired cure temperature.

The polymer materials according to the invention may advantageously replace the polymer materials containing CNTs of the prior art and be used in many fields, especially in electronics (they may be conductors, semiconductors or insulators depending on the temperature and their structure), in mechanical systems, for example for reinforcing composites (CNTs are one hundred times stronger and six times lighter than steel) and in electromechanical systems (they may expand or contract by injecting charge). For example, mention may be made of materials intended for example for the packaging of electronic components, for the manufacture of fuel lines, antistatic coatings, in thermistors, electrodes for supercapacitors, etc.

EXAMPLES

The following products were used:

Epoxy polymer: this was a diglycidyl ether of bisphenol A (DGEBA) of 383 g/mol molar mass with an average hydroxyl group number per one epoxy group of n=0.075, sold by Ciba-Geigy under the brand name LY556.

Hardener: this was an amine hardener, namely the aromatic diamine 4,4'-methylenebis(3-chloro-2,6-diethylaniline) sold by Lonza under the brand name LONZACURE M-CDEA. This product is characterized by a melting point of between 87° C. and 90° C. and a molar mass of 380 g/mol.

Particle dispersant: this was an A/B/C triblock copolymer of the ABC3 type.

Carbon particles: carbon nanotubes obtained according to the method described in WO 03/002456 A2 were used. These nanotubes had a diameter of between 10 and 30 nm and a length of greater than 0.4 µm. They were of the multi-walled (MW) type, not purified and not functionalized and represented in total or by more than 98% in separated form, that is to say not aggregated.

Preparation of the compounds: 2 g of DGEBA were heated at 135° C., and, after liquefaction, 440 mg of ABC3 triblock were added and left, with stirring, at 135° C. for 3 h. Next, 44 mg of CNT were added and stirring maintained at temperature for 12 h. Next, 2 g of MCDEA hardener were added and stirring applied for 5 min at 135° C. The compound was then cast into a mould and cured for 5 hours at 135° C.

The invention claimed is:

1. Polymer material comprising:
   99 to 20 parts by weight of polymers;
   0.1 to 80 parts by weight of carbon nanotubes; and
   0.05 to 80 parts by weight of at least one dispersant selected from A/B/C, B/C, C/B/C block copolymers or mixtures thereof in which:
   each block is linked to another by means of a covalent bond or an intermediate molecule linked to one of the blocks via a covalent bond and to the other block via another covalent bond,
   C provides an interaction of the chemical and/or physical type with the polymer material,
   B is not miscible with the polymer material and with the block C, and its glass transition temperature $T_g$ is below the usage temperature of the polymer material and
   A is not miscible with the polymer material, the block B and the block C, and its $T_g$ or its melting point $T_m$ is above the $T_g$ of B.

2. Material according to claim 1, in which the blocks C of the block copolymers are formed from PMMA syndiotactic to at least 60%.

3. Material according to claim 1, in which the blocks C of the block copolymers comprise reactive monomers.

4. Material according to claim 1, in which the $T_g$ of the blocks B of the block copolymers is below 0° C.

5. Material according to claim 4, in which the blocks B of the block copolymers comprise 1,4-polybutadiene.

6. Material according to claim 5, in which the dienes of the block B are hydrogenated.

7. Material according to claim 4, in which the block B consists of polybutyl acrylate.

8. Material according to claim 1, in which the $T_g$ or the $T_m$ of the blocks A is above 23° C.

9. Material according to claim 8, in which A is polystyrene.

10. Material according to claim 1, in which the number-average molar mass of the dispersant is between 10 000 g/mol and 500 000 g/mol.

11. Material according to claim 1, in which the proportion of dispersant(s) is 1 to 35% per 99 to 65% of polymer respectively.

12. Material according to claim 1, in which the proportion of carbon nanotubes represents 0.1 to 30 parts by weight of the total mass of the polymer material.

13. Material according to claim 1, in which the dispersant comprises at least one of the C/B/C or A/B/C block copolymers and at least one polymer selected from: core-shell copolymers (E), functionalized elastomers, A/B block copolymers, ATBN or CTBN reactive rubbers.

14. Material according to claim 13, in which the dispersant includes at least one A/B/C block copolymer and at least one A/B block copolymer and/or at least one core-shell copolymer (E) and/or at least one ATBN or CTBN reactive rubbers and optionally an A/B block copolymer.

15. Material according to claim 1, in which all or part of the A/B/C triblock is replaced with a C/A/B/A/C and/or C/B/A/B/C pentablock.

16. Material according to claim 1, in which the polymer is selected from PA, PPE/PA, PS, ABS, PMMA, PC, epoxy-based polymers or PVDF-based polymers.

17. Material according to claim 1, in which C is miscible with said material.

18. Material according to claim 3, in which said reactive monomer is selected from glycidyl (meth)acrylate, tert-butyl (meth)acrylate or mixtures thereof.

19. Material according to claim 4, in which the $T_g$ of the blocks B of the block copolymers is below −20° C.

20. Material according to claim 1, in which the $T_g$ or the $T_m$ of the blocks A is above 50° C.

21. Material according to claim 1, in which the number-average molar mass of the dispersant is between 20 000 g/mol and 200 000 g/mol.

22. Material according to claim 1, in which the proportion of carbon nanotubes represents 0.5 to 20 parts by weight of the total mass of the polymer material.

23. Material according to claim 13, in which the carbon nanotubes comprise multi-walled nanotubes (MWNT) having a diameter being between 5 and 30 nm and their length being 0.3 µm or higher.

24. Material according to claim 13, in which the blocks A have a number-average molar mass between 10 000 g/mol and 500 000 g/mol.

* * * * *